(12) United States Patent
Teranishi

(10) Patent No.: US 9,384,712 B2
(45) Date of Patent: Jul. 5, 2016

(54) LIQUID CRYSTAL DISPLAY DEVICE, METHOD OF DRIVING LIQUID CRYSTAL DISPLAY DEVICE, AND ELECTRONIC APPARATUS

(71) Applicant: JAPAN DISPLAY INC., Tokyo (JP)

(72) Inventor: Yasuyuki Teranishi, Kanagawa (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/697,798

(22) Filed: Apr. 28, 2015

(65) Prior Publication Data

US 2015/0243255 A1    Aug. 27, 2015

Related U.S. Application Data

(63) Continuation of application No. 13/740,648, filed on Jan. 14, 2013, now Pat. No. 9,047,839.

(30) Foreign Application Priority Data

Mar. 1, 2012    (JP) .................................. 2012-045288

(51) Int. Cl.
*G09G 5/18* (2006.01)
*G09G 3/36* (2006.01)
*G06T 1/60* (2006.01)

(52) U.S. Cl.
CPC .. *G09G 5/18* (2013.01); *G06T 1/60* (2013.01); *G09G 3/3607* (2013.01); *G09G 3/3648* (2013.01); *G09G 3/3696* (2013.01); *G09G 2300/0857* (2013.01); *G09G 2320/0204* (2013.01); *G09G 2320/0247* (2013.01)

(58) Field of Classification Search
CPC ..................... G09G 2300/0857; G09G 3/3648; G09G 3/3614; G09G 2300/0842; G09G 2300/0852; G09G 2320/0247; G09G 3/2011
See application file for complete search history.

(56) References Cited

U.S. PATENT DOCUMENTS

| | | | |
|---|---|---|---|
| 2007/0176875 A1 | 8/2007 | Kageyama et al. | |
| 2009/0091579 A1* | 4/2009 | Teranishi ............. | G09G 3/3659 345/530 |
| 2011/0090196 A1 | 4/2011 | Li et al. | |
| 2012/0154736 A1* | 6/2012 | Nagasawa ............. | H01L 27/124 349/158 |
| 2012/0188166 A1 | 7/2012 | Nurmi et al. | |

FOREIGN PATENT DOCUMENTS

| | | |
|---|---|---|
| JP | 11184443 A * | 7/1999 |
| JP | 2004-004664 | 1/2004 |

(Continued)

OTHER PUBLICATIONS

Taiwanese Office Action mailed Feb. 6, 2015, for corresponding Taiwanese Patent Application No. 101141944.

(Continued)

*Primary Examiner* — Koosha Sharifi-Tafreshi
(74) *Attorney, Agent, or Firm* — K&L Gates LLP

(57) ABSTRACT

A liquid crystal display device is provided. The liquid crystal including an array of pixels each having a memory function; and a buffer to output a first voltage, wherein a second voltage is supplied to a counter electrode of a liquid crystal capacitor, and wherein each of the pixels supplies one of the first voltage and the second voltage to a pixel electrode of the liquid crystal capacitor according to a data value stored in the each of the pixels.

3 Claims, 14 Drawing Sheets

(56) References Cited

FOREIGN PATENT DOCUMENTS

| | | |
|---|---|---|
| JP | 2007-147932 | 6/2007 |
| JP | 2007-199441 | 8/2007 |
| JP | 2008-197349 | 8/2008 |
| TW | 591596 | 6/2004 |
| TW | 201011722 | 3/2010 |

OTHER PUBLICATIONS

Notice of Rejection issued in connection with Japanese Patent Application No. 2012-045288, dated Mar. 3, 2015. (7 pages).

* cited by examiner

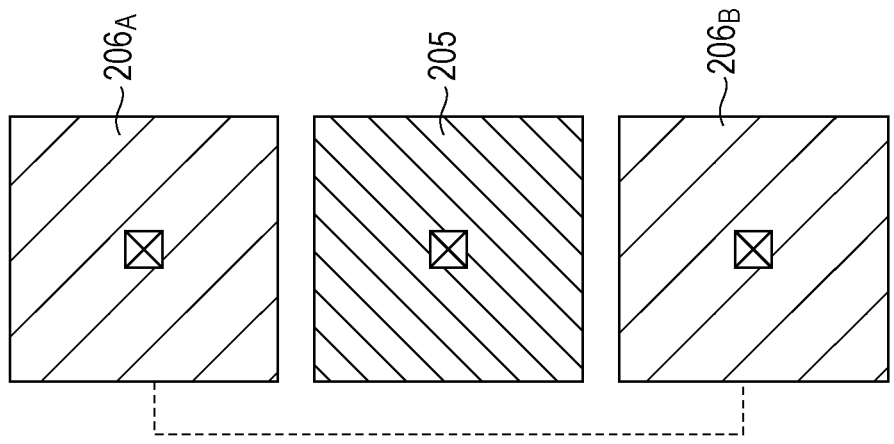
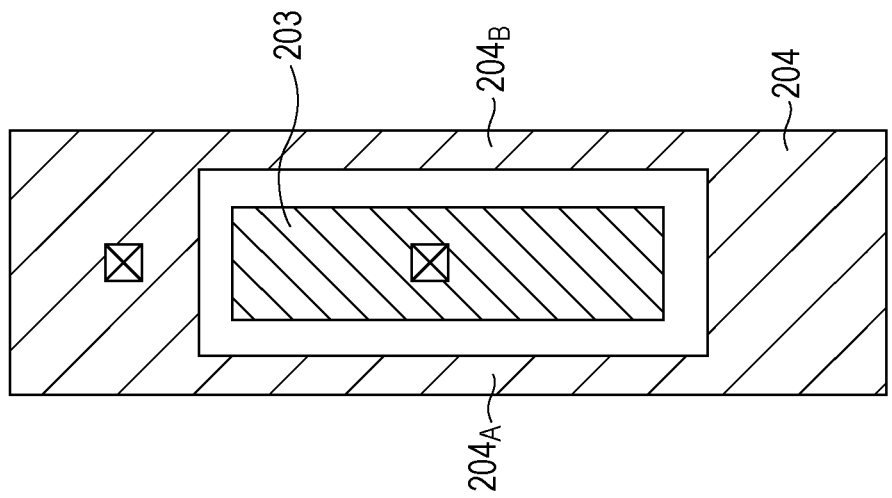
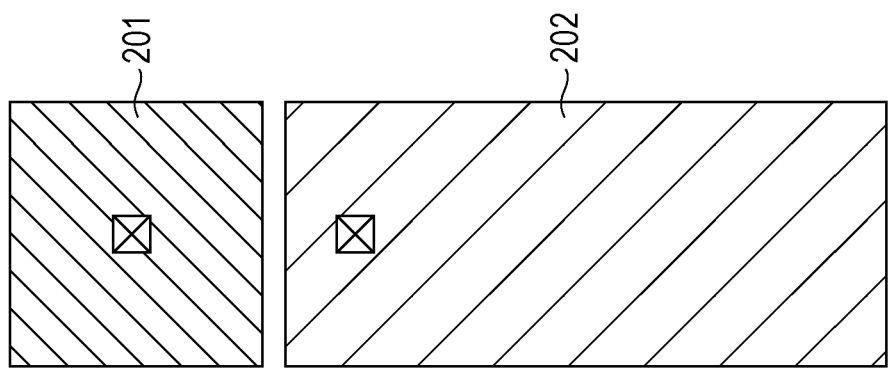

000# LIQUID CRYSTAL DISPLAY DEVICE, METHOD OF DRIVING LIQUID CRYSTAL DISPLAY DEVICE, AND ELECTRONIC APPARATUS

CROSS REFERENCES TO RELATED APPLICATIONS

The present application is a continuation of U.S. patent application Ser. No. 13/740,648, filed on Jan. 14, 2013, which claims priority to Japanese Priority Patent Application JP 2012-045288 filed in the Japan Patent Office on Mar. 1, 2012, the entire content of which is hereby incorporated by reference.

BACKGROUND

The present disclosure relates to a liquid crystal display device, a method of driving a liquid crystal display device, and an electronic apparatus.

Among liquid crystal display devices, there are liquid crystal display devices including an array of pixels each having a memory function, for example, so-called Memory-In-Pixel (MIP) liquid crystal display devices that have a memory section capable of storing data within each pixel (see, for example, Japanese Unexamined Patent Application Publication No. 2007-147932).

In this type of liquid crystal display device, a common voltage $V_{COM}$ is applied to the counter electrode of a liquid crystal capacitor, in common to all pixels. Also, a voltage FRP in phase with the common voltage $V_{COM}$ or a voltage XFRP in opposite phase is applied to the pixel electrode of the liquid crystal capacitor as appropriate.

SUMMARY

It is recognized that when a DC voltage is constantly applied to a liquid crystal capacitor in a liquid crystal display device, flicker is caused by this DC voltage. In related art, in order to suppress this flicker caused by the DC voltage that is constantly applied, techniques such as adjusting the voltage value of the common voltage $V_{COM}$ have been used.

It is desirable to provide a liquid crystal display device that can suppress flicker caused by a DC voltage that is constantly applied to the liquid crystal capacitor, without using techniques such as adjusting the voltage value of the common voltage, a method of driving the liquid crystal display device, and an electronic apparatus having the liquid crystal display device.

According to an embodiment of the present disclosure, there is provided a liquid crystal display device including an array of pixels each having a memory function, a driving section that supplies a common voltage to a counter electrode of a liquid crystal capacitor, and supplies one of a first voltage and a second voltage to a pixel electrode of the liquid crystal capacitor, the first voltage being the same as the common voltage, the second voltage reversing polarity every predetermined period, and an adjusting section that adjusts an amplitude of at least the second voltage. The liquid crystal display device according to an embodiment of the present disclosure is suitable for use in various electronic apparatuses as their display section.

Also, according to an embodiment of the present disclosure, there is provided a method of driving a liquid crystal display device that includes an array of pixels each having a memory function, the liquid crystal display device being configured to supply a common voltage to a counter electrode of a liquid crystal capacitor, and supply one of a first voltage and a second voltage to a pixel electrode of the liquid crystal capacitor, the first voltage being the same as the common voltage, the second voltage reversing polarity every predetermined period, the method including adjusting an amplitude of at least the second voltage.

In this regard, the first voltage that is the same as the common voltage refers to a voltage that is in phase with the common voltage when the common voltage is a voltage that reverses polarity every predetermined period, and refers to a DC voltage with the same voltage value as the common voltage when the common voltage is a DC voltage. When the common voltage is a voltage that reverses polarity every predetermined period, the amplitude of each of the first voltage and the second voltage is adjusted, and when the common voltage is a DC voltage, the amplitude of the second voltage is adjusted.

Now, a case where the common voltage is a voltage that reverses polarity every predetermined period is considered. In this case, by adjusting the amplitude of each of the first voltage that is in phase with the common voltage and the second voltage in opposite phase, the DC voltage that is constantly applied to the liquid crystal capacitor can be compensated for by the amount of amplitude adjustment. The amplitude of each of the first voltage and the second voltage can be easily adjusted by changing the power supply voltage on each of the buffers that output these voltages. Therefore, even without using techniques such as adjusting the voltage value of the common voltage, flicker caused by the DC voltage constantly applied to the liquid crystal capacitor can be suppressed by the technique of changing the power supply voltage on the buffer, which is a very simple technique in comparison to these techniques.

Additional features and advantages are described herein, and will be apparent from the following Detailed Description and the figures.

BRIEF DESCRIPTION OF THE FIGURES

FIGS. 5A to 5C illustrate division of a pixel in an area coverage modulation method;

DETAILED DESCRIPTION

Figure 1:
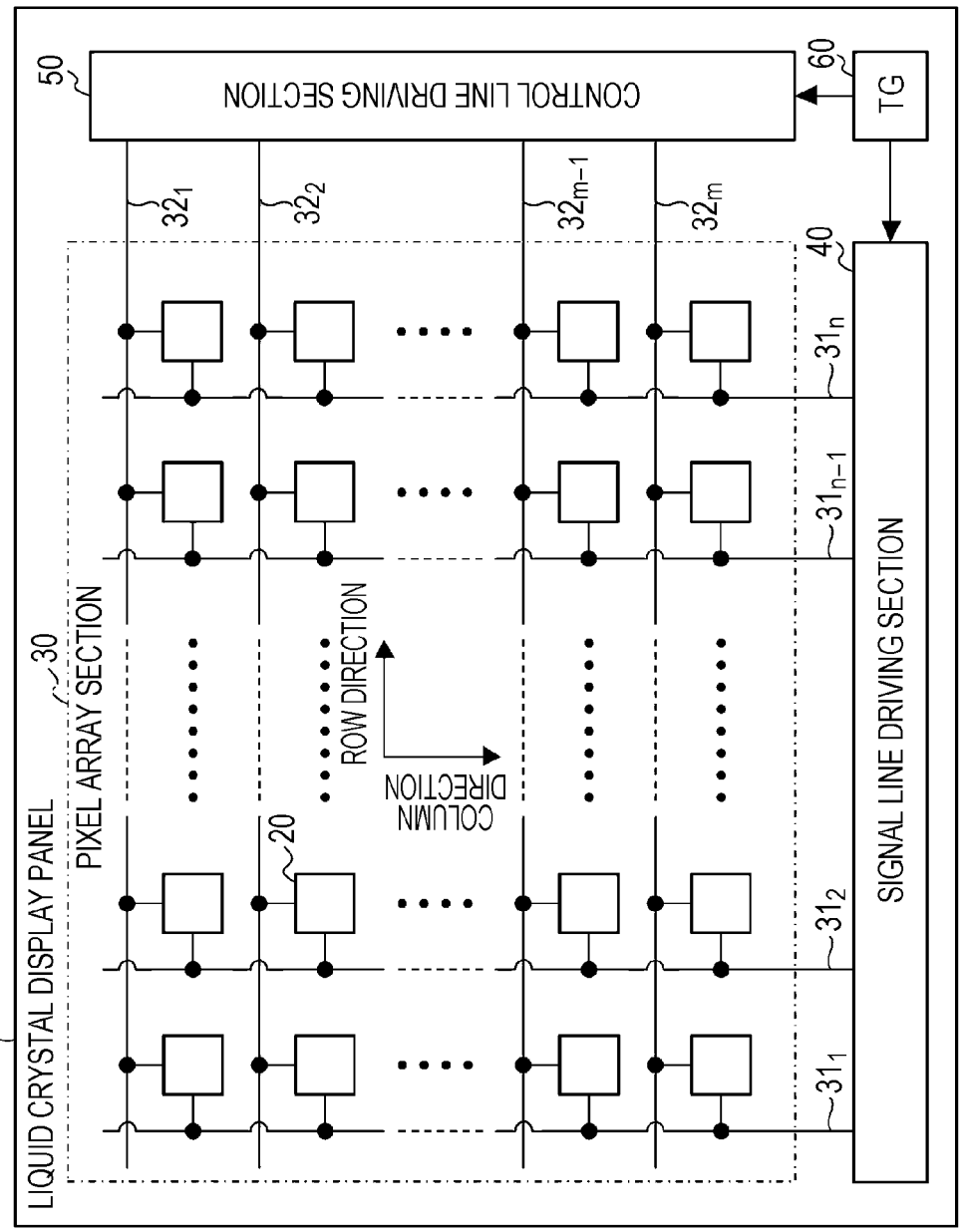
FIG. 1 is a system configuration diagram schematically illustrating the configuration of an active matrix liquid crystal display device according to an embodiment of the present disclosure.

Hereinafter, modes for carrying out the present disclosure (hereinafter, referred to as "embodiments") will be described in detail with reference to the drawings. The present disclosure is not limited to the embodiments, and various numerical values and the like used in the embodiments are illustrative only. In the following description, the same elements or elements having the same functions are denoted by the same symbols, and repetitive description of those elements is omitted. The description will be given in the following order.

1. Overview of a liquid crystal display device, a method of driving a liquid crystal display device, and an electronic apparatus according to an embodiment of the present disclosure
2. Liquid crystal display device according to an embodiment
   2-1. System configuration
   2-2. MIP pixel
   2-3. Area coverage modulation method
   2-4. Problem of flicker caused by a DC voltage constantly applied to the liquid crystal capacitor
   2-5. Characteristic features according to an embodiment
3. Electronic apparatus
4. Configuration according to an embodiment of the present disclosure <1. Overview of a Liquid Crystal Display Device, a Method of Driving a Liquid Crystal Display Device, and an Electronic Apparatus According to an Embodiment of the Present Disclosure>

A liquid crystal display device according to an embodiment of the present disclosure is a liquid crystal display device including an array of pixels each having a memory function. This type of liquid crystal display device can be exemplified by a so-called Memory-In-Pixel (MIP) liquid crystal display device having a memory section capable of storing data within each pixel. Also, a liquid crystal display device having a memory function in each pixel can be configured by using a liquid crystal with memory property for each pixel. The liquid crystal display device according to an embodiment of the present disclosure may be a liquid crystal display device adapted to monochrome display, or a liquid crystal display device adapted to color display.

A liquid crystal display device having a memory function in each pixel is able to store data in each pixel, and thus can achieve display in an analog display mode and display in a memory display mode by a mode selector switch. The "analog display mode" refers to a display mode which displays the gray level of a pixel in an analog manner. Also, the "memory display mode" refers to a display mode which displays the gray level of a pixel in a digital manner on the basis of binary information (logic "1"/"0") stored in the pixel.

A pixel having a memory function is driven by supplying a common voltage to the counter electrode of a liquid crystal capacitor, and supplying a first voltage or a second voltage to the pixel electrode of the liquid crystal capacitor. The first voltage is the same as the common voltage. The second voltage reverses polarity every predetermined period. A liquid crystal capacitor means a capacitor that is generated on a pixel-by-pixel basis between a pixel electrode and a counter electrode opposed to the pixel electrode.

At this time, the common voltage may be a voltage that reverses polarity every predetermined period, or may be a DC voltage. A drive method using a common voltage that reverses polarity every predetermined period is a so-called common inversion ($V_{COM}$ inversion) drive method.

In this regard, when the common voltage is a voltage that reverses polarity every predetermined period, as the first voltage that is the same as the common voltage, a voltage that is in phase with the common voltage is used. At this time, the second voltage is a voltage that is in opposite phase with the common voltage.

When the common voltage is a DC voltage, as the first voltage that is the same as the common voltage, a DC voltage with the same voltage value as the common voltage is used. At this time, the second voltage is a voltage that reverses polarity every predetermined period.

In a liquid crystal display device, a DC voltage is constantly applied to the liquid crystal capacitor owing to the battery effect between the counter electrode and the pixel electrode of the liquid crystal capacitor. It is recognized that if a DC voltage is constantly applied to the liquid crystal capacitor, flicker is caused by this DC voltage.

Accordingly, the characteristic features of a liquid crystal display device, a method of driving a liquid crystal display device, and an electronic apparatus according to an embodiment of the present disclosure reside in adopting a configuration in which the amplitude of at least the second voltage is adjusted in order to suppress flicker caused by a DC voltage constantly applied to the liquid crystal capacitor.

In this regard, "at least the second voltage" means the first voltage and the second voltage when the common voltage is a voltage that reverses polarity every predetermined period, and means the second voltage when the common voltage is a DC voltage.

When the common voltage is a voltage that reverses polarity every predetermined period, the amplitude of each of the first voltage and the second voltage is to be adjusted. When the common voltage is a DC voltage, the second voltage, preferably its amplitude, is to be adjusted so that its average value is shifted to the positive side with respect to the common voltage.

In adjusting the amplitude of each of the first voltage and the second voltage, or the amplitude of the second voltage, it is preferable to adjust the voltage value on the positive side by an amount equal to twice the DC voltage constantly applied to the liquid crystal capacitor. By making the amount of adjustment of the voltage value on the positive side equal to twice the DC voltage constantly applied to the liquid crystal capacitor in this way, the DC voltage constantly applied to the liquid crystal capacitor can be compensated for by the amount of amplitude adjustment.

Each of the first voltage and the second voltage is supplied via a buffer, that is, outputted from a buffer. Therefore, in adjusting the voltage value on the positive side, it is preferable to set the voltage value on the positive side by the power supply voltage on the buffer. As a result, flicker caused by a DC voltage constantly applied to the liquid crystal capacitor can be suppressed by the very simple technique of changing the power supply voltage on the buffer.

<2. Liquid Crystal Display Device According to an Embodiment>

Next, an active matrix liquid crystal display device as the liquid crystal display device according to an embodiment of the present disclosure will be described.

[2-1. System Configuration]

FIG. 1 is a system configuration diagram schematically illustrating the configuration of an active matrix liquid crystal display device according to an embodiment of the present disclosure. The panel structure of the liquid crystal display device is such that two substrates (not illustrated), at least one of which is transparent, are arranged facing each other with a predetermined distance, and the liquid crystal is sealed between these two substrates.

A liquid crystal display device 10 according to this embodiment includes a pixel array section 30, and a display driving section arranged around the pixel array section 30. In the pixel array section 30, multiple pixels 20 each including a liquid crystal capacitor are arrayed in a matrix two-dimensionally. The display driving section includes a signal line driving section 40, a control line driving section 50, a drive timing generating section 60, and the like. For example, the display driving section is integrated on the same liquid crystal display panel (substrate) 11 as the pixel array section 30, and drives the pixels 20 in the pixel array section 30.

In this regard, in a case where the liquid crystal display device 10 is adapted to color display, each pixel is formed by multiple sub-pixels, and each of the sub-pixels corresponds to the pixel 20. More specifically, in a liquid crystal display device for color display, each pixel is formed by three sub-pixels, i.e. a red (R) light sub-pixel, a green (G) light sub-pixel, and a blue (B) light sub-pixel.

However, each pixel may not necessarily be a combination of three RGB primary color sub-pixels. One color or multiple colors of sub-pixels can be further added to the three primary color sub-pixels to form each pixel. More specifically, for example, each pixel can be also formed by adding a white light sub-pixel for luminance enhancement, or each pixel can be formed by adding at least one complementary color light sub-pixel in order to increase the color reproduction range.

The liquid crystal display device 10 according to this embodiment uses a pixel having a memory function as the pixel 20, for example, a MIP pixel which has a memory section capable of storing data for every pixel, and can be adapted to both display in the analog display mode and display in the memory display mode. In the liquid crystal display device 10 using the MIP pixel, a constant voltage is applied to the pixel 20 at all times, which advantageously addresses the problem of shading caused by variation of voltage with time due to leakage of light from the pixel transistor or the like.

In FIG. 1, for an array of pixels in m rows and n columns in the pixel array section 30, signal lines $31_1$ to $31_n$ (hereinafter, also sometimes simply referred to as "signal line(s) 31") are wired along the column direction for every column of pixels. Also, control lines $32_1$ to $32_m$ (hereinafter, also sometimes simply referred to as "control line(s) 32") are wired along the row direction for every row of pixels. The term "column direction" refers to the array direction of pixels on each column of pixels (i.e. vertical direction), and the term "row direction" refers to the array direction of pixels on each row of pixels (i.e. horizontal direction).

One end of each of the signal lines 31 ($31_1$ to $31_n$) is connected to each of the output terminals of the signal line driving section 40 corresponding to individual columns of pixels. The signal line driving section 40 outputs a signal potential reflecting an arbitrary gray level (analog potential in the analog display mode or binary potential in the memory display mode) to the corresponding signal line 31. Also, for example, even in the memory display mode, the signal line driving section 40 outputs a signal potential reflecting a necessary gray level to the corresponding signal line 31 when changing the logic level of the signal potential held within the pixel 20.

FIG. 1 depicts each of the control lines $32_1$ to $32_m$ as a single wire. However, each of the control lines $32_1$ to $32_m$ may not necessarily be a single wire. In actuality, each of the control lines $32_1$ to $32_m$ is formed by multiple wires. One end of each of the control lines $32_1$ to $32_m$ is connected to each of the output terminals of the control line driving section 50 corresponding to individual rows of pixels. For example, in the analog display mode, the control line driving section 50 controls a write operation of a signal potential reflecting a gray level, which is outputted from the signal line driving section 40 to each of the signal lines $31_1$ to $31_n$, to the pixel 20.

The drive timing generating section (timing generator (TG)) 60 generates various drive pulses (timing signals) for driving the signal line driving section 40 and the control line driving section 50, and supplies the drive pulses to the driving sections 40 and 50.

[2-2. MIP Pixel]

Next, a MIP pixel used as the pixel 20 will be described. A MIP pixel can be adapted to both display in the analog display mode and display in the memory display mode. As previously mentioned, the analog display mode refers to a display mode which displays the gray level of a pixel in an analog manner. The memory display mode refers to a display mode which displays the gray level of a pixel in a digital manner on the basis of binary information (logic "1"/"0") stored in the memory within the pixel.

In the memory display mode, information held in the memory section is used, and thus it is unnecessary to execute a write operation of a signal potential reflecting a gray level every frame period. Therefore, the memory display mode has an advantage in that power consumption can be reduced in comparison to the analog display mode in which it is necessary to execute a write operation of a signal potential reflecting a gray level every frame period, in other words, the power consumption of the display device can be reduced.

Figure 2:
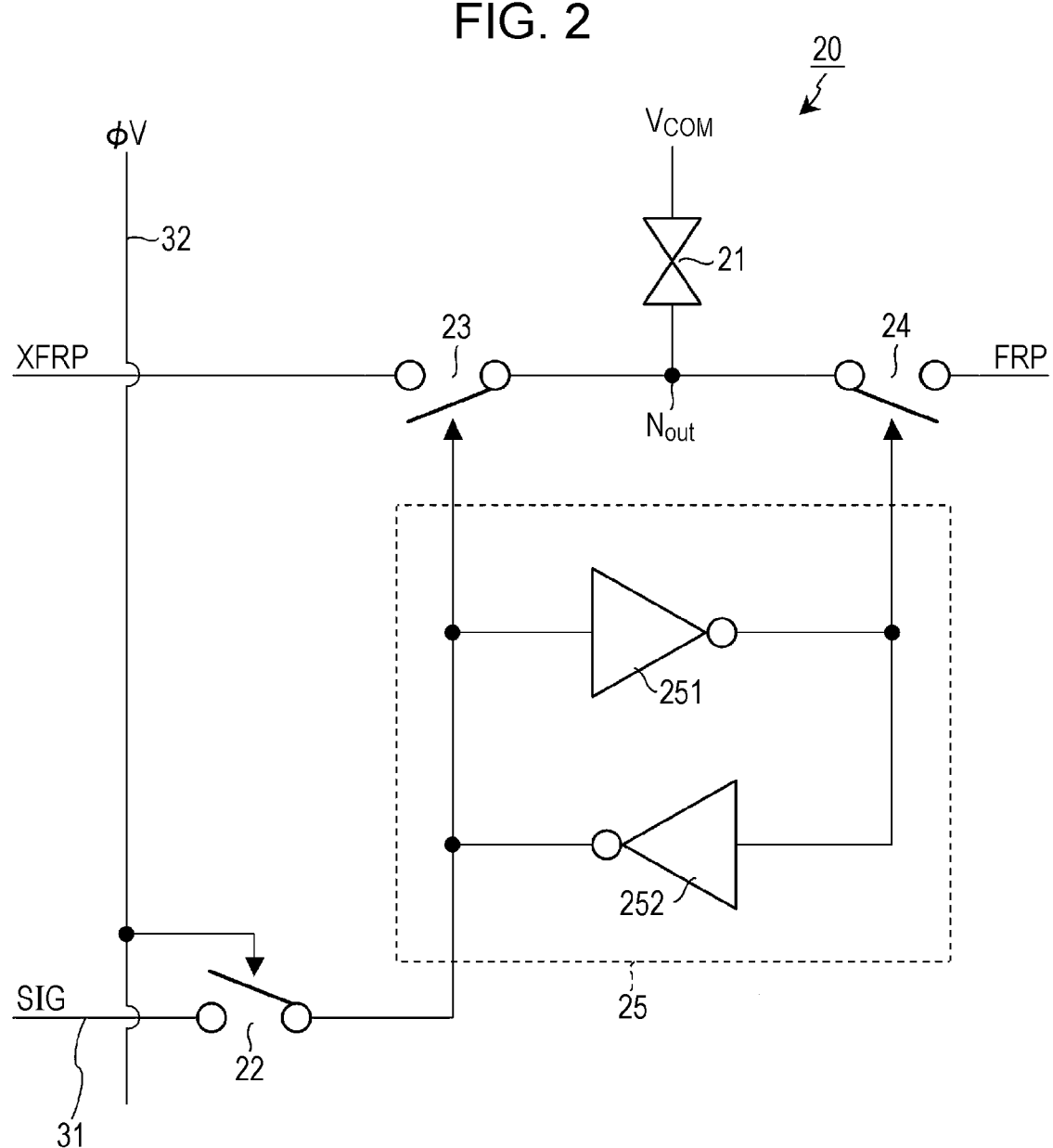
FIG. 2 is a block diagram illustrating an example of the circuit configuration of a MIP pixel.
Figure 3:
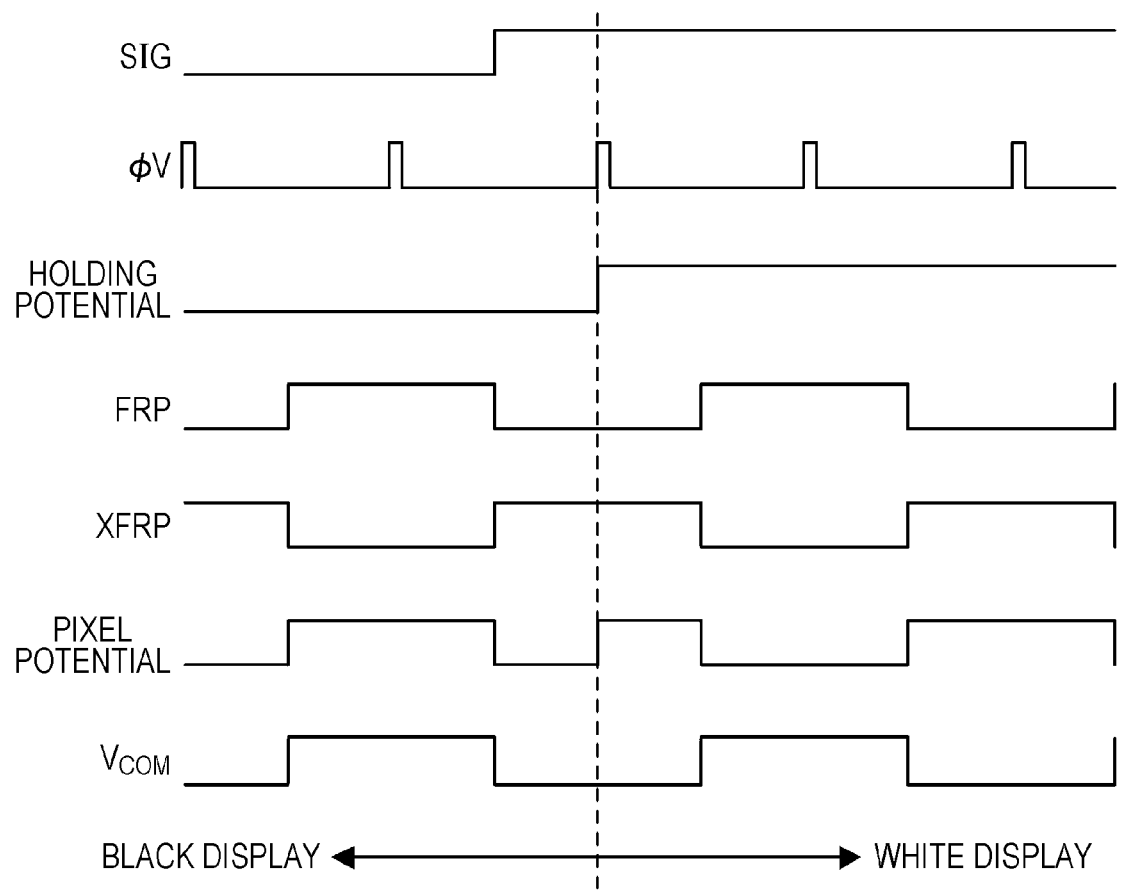
FIG. 3 is a timing chart used for explaining the operation of a MIP pixel.

FIG. 2 is a block diagram illustrating an example of the circuit configuration of the pixel 20 of a MIP type. FIG. 3 is a timing chart used for explaining the operation of the pixel 20 of a MIP type.

Although not illustrated for the simplicity of the drawings, the pixel 20 has a pixel transistor formed by a thin film transistor (TFT), and a storage capacitor, in addition to the liquid crystal capacitor 21. The liquid crystal capacitor 21 means the capacitance component of a liquid crystal material which is generated between a pixel electrode and a counter electrode opposed to the pixel electrode. A common voltage $V_{COM}$ is applied to the counter electrode of the liquid crystal capacitor 21, in common to all pixels. As illustrated in the timing chart of FIG. 3, the common voltage $V_{COM}$ is a voltage that reverses polarity every predetermined period (e.g. every frame period).

The pixel 20 further includes a SRAM function having three switching elements 22 to 24 and a latch section 25. One end of the switching element 22 is connected to the signal line 31 (corresponding to each of the signal lines $31_1$ to $31_n$ in FIG. 1). The switching element 22 becomes ON (closed) upon application of a scan signal 4V via the control line 32 (corresponding to each of the control lines $32_1$ to $32_m$ in FIG. 1) from the control line driving section 50 in FIG. 1, and captures data SIG supplied via the signal line 31 from the signal line driving section 40 in FIG. 1. The control line 32 in this case is a scanning line. The latch section 25 includes inverters 251 and 252 that are connected in parallel in directions opposite to each other. The latch section 25 holds (latches) a potential according to the data SIG captured by the switching element 22.

A voltage FRP in phase with the common voltage $V_{COM}$ and a voltage XFRP in opposite phase are applied to one terminal of the switching element 24 and one terminal of the switching element 23, respectively. The other terminals of the switching elements 23 and 24 are connected in common, and serve as the output node $N_{out}$ of the pixel circuit according to an embodiment of the present disclosure. One of the switching elements 23 and 24 becomes ON in accordance with the polarity of the holding potential of the latch section 25. As a result, the voltage FRP in phase with the common voltage $V_{COM}$ or the voltage XFRP in opposite phase is applied to the pixel electrode of the liquid crystal capacitor 21 whose counter electrode is being applied with the common voltage $V_{COM}$.

As can be appreciated from FIG. 3, in the case of a liquid crystal panel that is normally black (i.e. displays black when no voltage is applied), when the holding potential of the latch section 25 is a negative-side polarity, the pixel potential of the liquid crystal capacitor 21 is in phase with the common voltage $V_{COM}$, thus resulting in black display. When the holding potential of the latch section 25 is a positive-side polarity, the pixel potential of the liquid crystal capacitor 21 is in opposite phase with the common voltage $V_{COM}$, thus resulting in white display.

As can be appreciated from the foregoing description, in the pixel 20 of a MIP type, as one of the switching elements 23 and 24 becomes ON in accordance with the polarity of the holding potential of the latch section 25, the in-phase voltage FRP or opposite-phase voltage XFRP is applied to the pixel electrode of the liquid crystal capacitor 21. As a result, as previously mentioned, a constant voltage is applied to the pixel 20 at all times, and hence there is no fear of shading.

Figure 4:
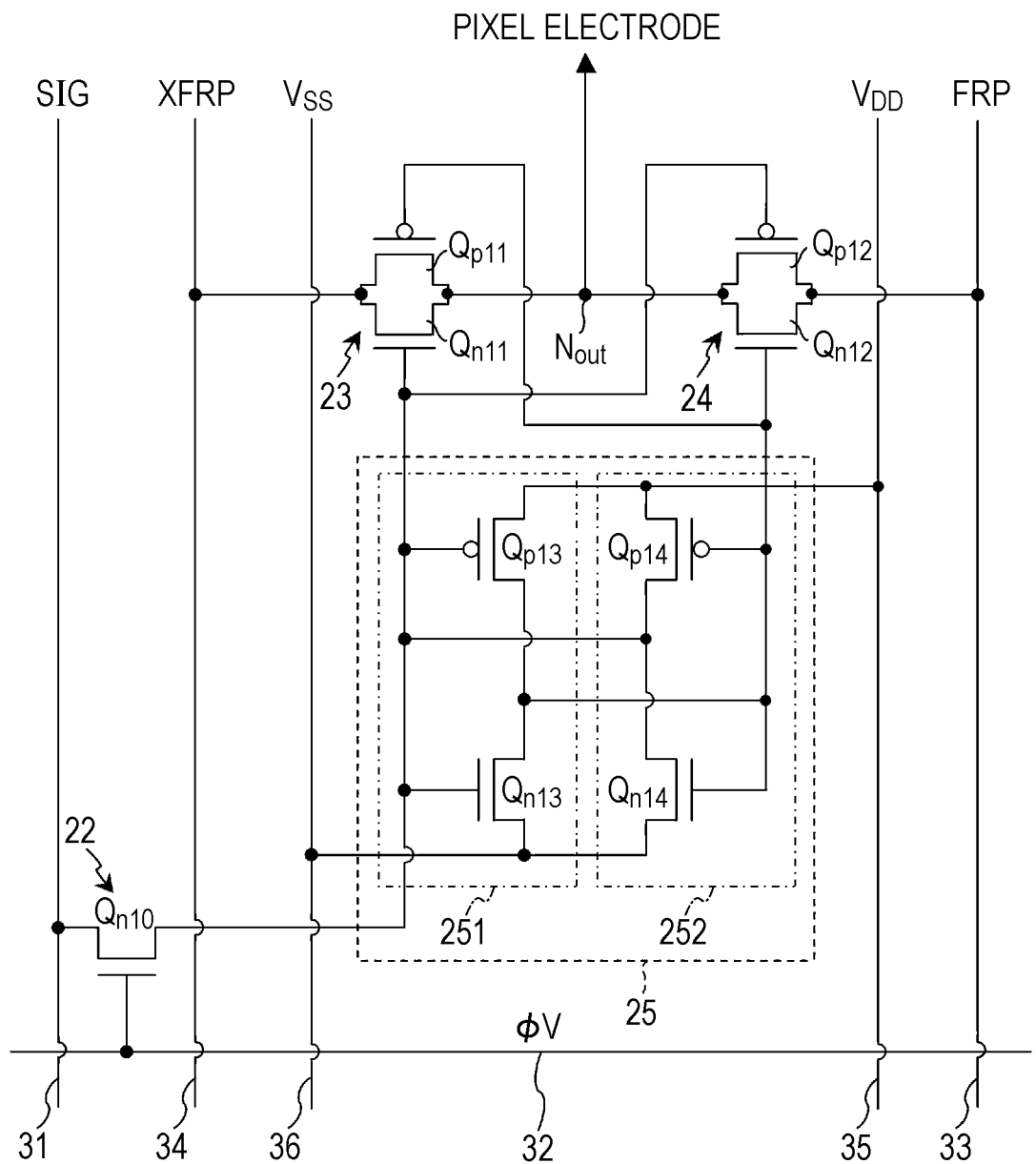
FIG. 4 is a circuit diagram illustrating an example of the specific circuit configuration of a MIP pixel.

FIG. 4 is a circuit diagram illustrating an example of the specific circuit configuration of the pixel 20. In FIG. 4, portions corresponding to those in FIG. 2 are denoted by the same symbols.

In FIG. 4, the switching element 22 is formed by, for example, an Nch-MOS transistor $Q_{n10}$. The source/drain electrode on one side of the Nch-MOS transistor $Q_{n10}$ is connected to the signal line 31, and its gate electrode is connected to the control line (scanning line) 32.

The switching elements 23 and 24 are each formed by, for example, a transfer switch including an Nch-MOS transistor and a Pch-MOS transistor that are connected in parallel. Specifically, in the switching element 23, an Nch-MOS transistor $Q_{n11}$ and a Pch-MOS transistor $Q_{p11}$ are connected in parallel to each other. In the switching element 24, an Nch-MOS transistor $Q_{n12}$ and a Pch-MOS transistor $Q_{p12}$ are connected in parallel to each other.

Each of the switching elements 23 and 24 may not necessarily be a transfer switch including an Nch-MOS transistor and a Pch-MOS transistor that are connected in parallel. Each of the switching elements 23 and 24 can be also formed by using a single-conductivity MOS transistor, that is, an Nch-MOS transistor or a Pch-MOS transistor. The common connection node of the switching elements 23 and 24 serves as the output node $N_{out}$ of the pixel circuit according to an embodiment of the present disclosure.

The inverters 251 and 252 are each formed by, for example, a CMOS inverter. Specifically, in the inverter 251, the respective gate electrodes and drain electrodes of an Nch-MOS transistor $Q_{n13}$ and a Pch-MOS transistor $Q_{p13}$ are connected to each other in common. In the inverter 252, the respective gate electrodes and drain electrodes of an Nch-MOS transistor $Q_{n14}$ and a Pch-MOS transistor $Q_{p14}$ are connected to each other in common.

The pixels 20 based on the above-mentioned circuit configuration are deployed in the row direction (horizontal direction) and the column direction (vertical direction) and arrayed in a matrix. With respect to this matrix array of the pixels 20, in addition to the signal line 31 for every column of pixels and the control line 32 for every row of pixels, wires 33 and 34 for transmitting the voltages FRP and XFRP that are in phase and in opposite phase with the common voltage $V_{COM}$, and power supply lines 35 and 36 for a positive-side power supply voltage $V_{DD}$ and a negative-side power supply voltage $V_{SS}$, respectively, are wired for every column of pixels.

As described above, in the active matrix liquid crystal display device 10 according to this embodiment, the pixels (MIP) 20 with a SRAM function having the latch section 25 that holds a potential according to display data are arrayed in a matrix. While this embodiment is directed to the case in which a SRAM is used as the memory section that is built in the pixel 20, the SRAM is illustrative only, and another memory section, for example, a DRAM may be used as well.

As previously mentioned, the liquid crystal display device 10 of a MIP type can achieve display in the analog display mode and display in the memory display mode because every pixel 20 has a memory function (memory section). In the memory display mode, display is performed by using pixel data held in the memory section. Therefore, it is unnecessary to execute a write operation of a potential reflecting a gray level every frame period at all times in order to perform a single execution of the write operation, which provides the advantage of reducing the power consumption of the liquid crystal display device 10.

There is also a desire to rewrite the display screen partially, that is, rewrite only a part of the display screen. In this case, it suffices to rewrite the pixel data partially. Rewriting the display screen partially, that is, rewriting the pixel data partially means that it is unnecessary to transfer data for pixels that are not to be rewritten. Therefore, there is also an advantage in that the amount of data transfer can be reduced, thereby further reducing the power consumption of the liquid crystal display device 10.

[2-3. Area Coverage Modulation Method]

Display devices having a memory function within each pixel, for example, MIP liquid crystal display devices can display only two gray levels by one bit for every pixel. For this reason, in adopting the MIP system, it is preferable to use an area coverage modulation method as a gray level representation system. In the area coverage modulation method, each pixel is formed by multiple sub-pixels, and gray levels are displayed by combinations of the areas of the electrodes of the multiple sub-pixels.

In this regard, "area coverage modulation method" is a gray level representation system that represents $2^N$ gray levels by N sub-pixel electrodes that are weighted with an area ratio of $2^0, 2^1, 2^2, \ldots, 2^{N-1}$. For example, this area coverage modulation is adopted for purposes such as mitigating non-uniformity of image quality due to variations in characteristics among thin film transistors (TFTs) that form the pixel circuit.

Specifically, an area coverage modulation method is employed in which the pixel electrode that serves as the display region of the pixel 20 is divided into multiple pixel (sub-pixel) electrodes weighted according to area. The pixel electrode may be either a transmitting electrode or a reflecting electrode. A pixel potential selected by the holding potential of the latch section 25 is passed through the area-weighted pixel electrodes, and gray levels are displayed by combinations of the weighted areas.

Now, for ease of understanding, an area coverage modulation method that represents four gray levels by two bits by assigning a weight of 2:1 to the area (pixel area) of the pixel electrodes (sub-pixel electrodes) will be described as a more specific example.

As a structure for assigning a weight of 2:1 to the pixel area, as illustrated in FIG. 5A, it is common to divide the pixel electrode of the pixel 20 into a sub-pixel electrode 201 with Area 1 and a sub-pixel electrode 202 with an area (Area 2) that is twice the area of the sub-pixel electrode 201. However, the structure in FIG. 5A is not preferable from the viewpoint of gray level representation because the center (center of gravity) of each gray level (display image) is not aligned (does not coincide) with the center (center of gravity) of one pixel.

As a structure for aligning the center of each gray level with the center of one pixel, as illustrated in FIG. 5B, it is conceivable to hollow out the center part of a sub-pixel electrode 204 with Area 2 in a rectangular shape, and arrange a sub-pixel electrode 203 with Area 1 in the center part of the hollowed out rectangular region. However, in the case of the structure in FIG. 5B, connecting parts $204_A$ and $204_B$ of the sub-pixel electrode 204 located on both sides of the sub-pixel electrode 203 are narrow, which reduces the reflecting area of the sub-pixel electrode 204 as a whole, and also makes it difficult to achieve liquid crystal alignment in the vicinity of the connecting parts $204_A$ and $204_B$.

As described above, to achieve a VA (vertical aligned) mode, in which liquid crystal molecules become substantially perpendicular to the substrate when no electric field is applied, by area coverage modulation, good liquid crystal alignment is difficult to achieve because the manner in which voltage is applied to the liquid crystal molecules varies with the electrode shape, electrode size, and the like. Also, the area ratio of sub-pixel electrodes does not necessarily become equal to reflectance ratio, which makes gray level design difficult. The reflectance is determined by the area of sub-pixel electrodes, liquid crystal alignment, and the like. In the case of the structure in FIG. 5A, even though the area ratio is 1:2, the ratio of the lengths around the electrodes does not become 1:2. Therefore, the area ratio of the sub-pixel electrodes does not necessarily become equal to reflectance ratio.

From this viewpoint, in adopting the area coverage modulation method, considering the ease of gray level representation and effective utilization of the reflecting area, it is preferable to employ a so-called three-division electrode configuration as illustrated in FIG. 5C in which the pixel electrode is divided into three sub-pixel electrodes 205, $206_A$, and $206_B$ with the same area (size).

In the case of this three-division electrode structure, the two sub-pixel electrodes $206_A$ and $206_B$ at the top and the bottom sandwiching the sub-pixel electrode 205 in the middle serve as a pair, and the pair of two sub-pixel electrodes $206_A$ and $206_B$ are driven simultaneously. At this time, the sub-pixel electrode 205 with Area 1 is connected to the lower-order bit, and the sub-pixel electrodes $206_A$ and $206_B$ with Area 2 are connected to the higher-order bit. In this way, a weight of 2:1 can be assigned to the pixel area between the two sub-pixel electrodes $206_A$ and $206_B$ and the sub-pixel electrode 205 in the middle. Also, because the sub-pixel electrodes $206_A$ and $206_B$ with Area 2 of the higher-order bit are divided into two equal parts, and arranged at the top and the bottom sandwiching the sub-pixel electrode 205 in the middle, the center (center of gravity) of each gray level can be aligned with the center (center of gravity) of one pixel.

When electrical contact with the driving circuit is to be established for each of the three sub-pixel electrodes 205, $206_A$, and $206_B$, the number of metal wire contacts increases in comparison to the structures in FIGS. 5A and 5B and thus the pixel size becomes larger, which hinders higher resolution. In particular, in the case of a MIP pixel configuration having a memory section for every pixel 20, as can be appreciated from FIG. 4, many circuit component elements such as transistors and contacts exist within each pixel 20, and there is not much extra layout area, which means that one contact alone greatly affects pixel size.

Figure 6:
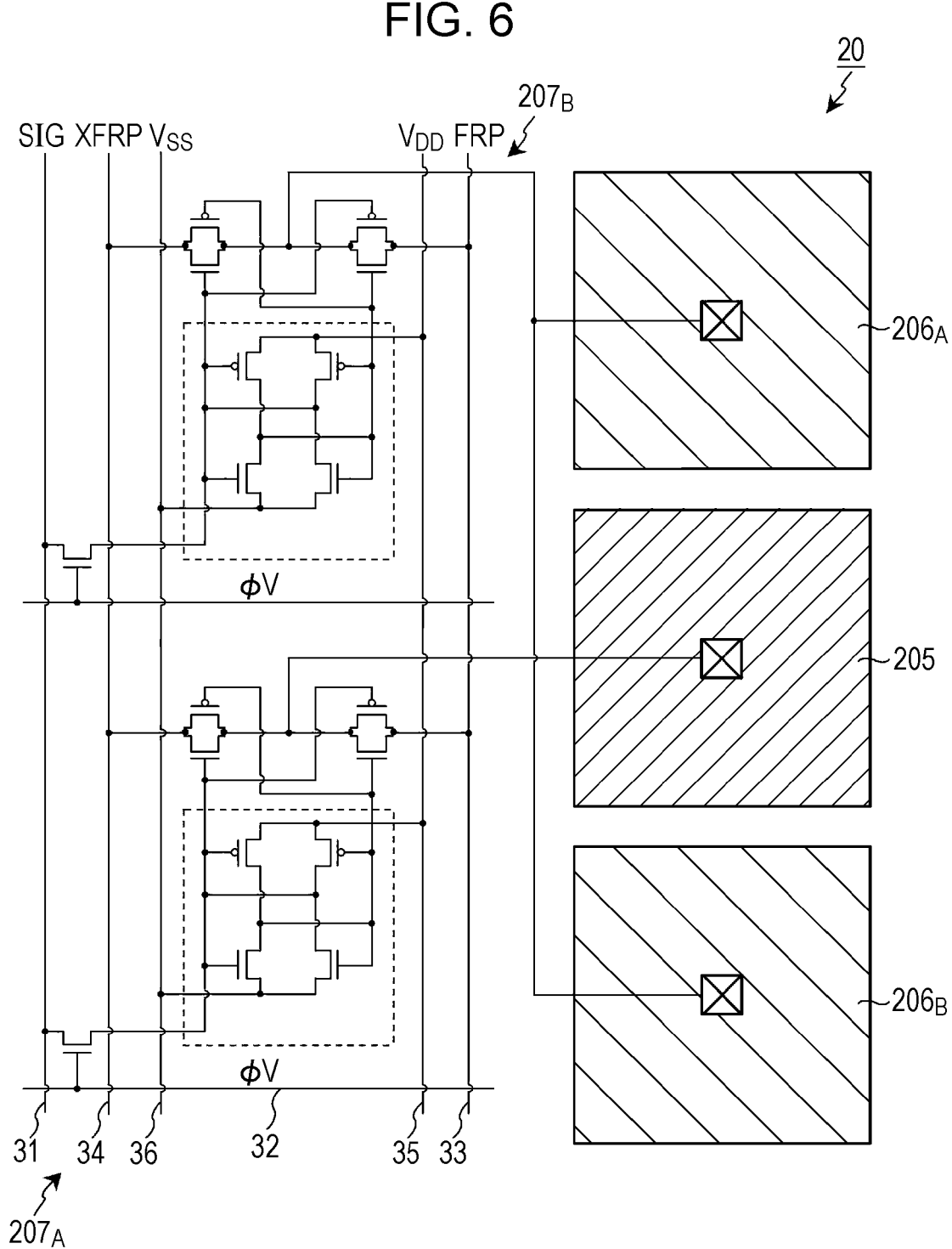
FIG. 6 is a circuit diagram illustrating the correspondence between three sub-pixel electrodes and two driving circuits in a three-division pixel structure.

The number of contacts can be reduced by adopting the following pixel structure. That is, the two sub-pixel electrodes $206_A$ and $206_B$, which sandwich one sub-pixel electrode 205 and are thus at a distance from each other, are electrically coupled (connected by wires) to each other. Then, as illustrated in FIG. 6, one sub-pixel electrode 205 is driven by one driving circuit $207_A$, and the remaining two sub-pixel electrodes $206_A$ and $206_B$ are driven simultaneously by another one driving circuit $207_B$. The driving circuits $207_A$ and $207_B$ each correspond to the pixel circuit illustrated in FIG. 4.

Figure 7:
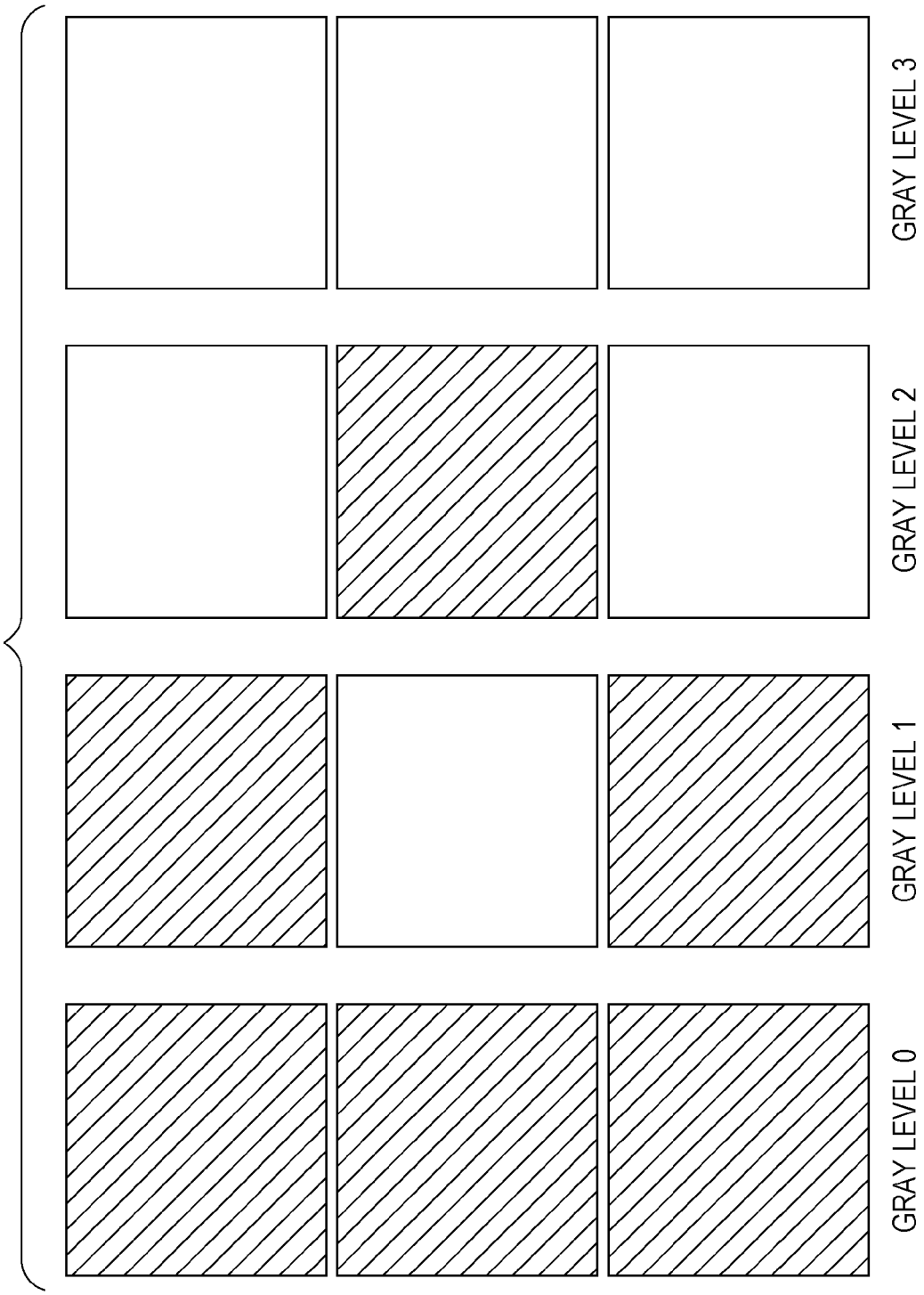
FIG. 7 illustrates an example of gray level representation by an area coverage modulation method which represents four gray levels by two bits by assigning a 2:1 weight to the pixel area.

Driving two sub-pixel electrodes $206_A$ and $206_B$ by one driving circuit $207_B$ in this way has the advantage of simplifying the circuit configuration of the pixel 20 in comparison to a case where the two sub-pixel electrodes $206_A$ and $206_B$ are driven by separate driving circuits. Also, in the area coverage modulation method according to this example, as illustrated in FIG. 7, a total of four gray levels are represented by two bits, including Gray Level 0 in which the three sub-pixels are all unlit, Gray Level 1 in which only the sub-pixel in the middle is lit, Gray Level 2 in which the two sub-pixels at the top and the bottom are lit, and Gray Level 3 in which the three sub-pixels are all lit.

While the foregoing description is directed to the case where a MIP pixel which has a memory section capable of storing data for every pixel is used as a pixel having a memory function, this is illustrative only. As a pixel having a memory function, other than a MIP pixel, for example, a pixel using an existing liquid crystal with memory property can be exemplified.

[2-4. Problem of Flicker Caused by a DC Voltage Constantly Applied to the Liquid Crystal Capacitor]

As previously mentioned, in a liquid crystal display device, a DC voltage is constantly applied to the liquid crystal capacitor owing to the battery effect between the counter electrode and the pixel electrode. It is recognized that if a DC voltage is constantly applied to the liquid crystal capacitor, flicker occurs owing to the DC voltage. To prevent flicker due to this DC voltage, adjusting sections employing various techniques are employed in related art. These related art techniques will be described below as reference examples.

Reference Example 1

Figure 8:
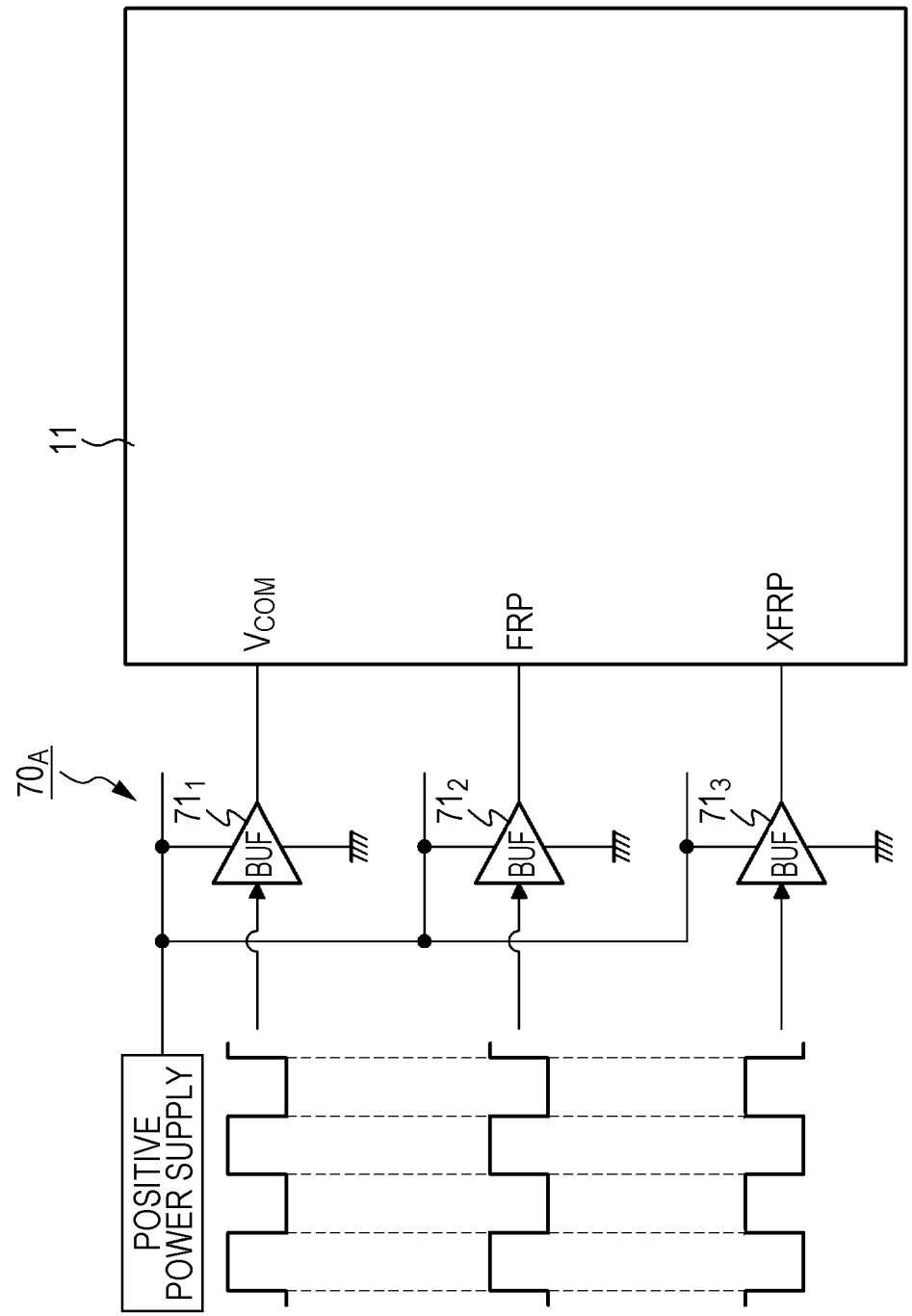
FIG. 8 is a configuration diagram illustrating an adjusting section according to Reference Example 1 for suppressing flicker.

FIG. 8 is a configuration diagram illustrating an adjusting section according to Reference Example 1 for suppressing flicker. As illustrated in FIG. 8, an adjusting section $70_A$ according to Reference Example 1 is provided, for example, outside the liquid crystal display panel 11. A common voltage $V_{COM}$, a voltage FRP in phase with the common voltage $V_{COM}$, and a voltage XFRP in opposite phase are respectively outputted from buffers $71_1$, $71_2$, and $71_3$ constituting the output stages of the adjusting section $70_A$, and applied to the liquid crystal display panel 11.

A power supply voltage for determining the voltage value on the positive side of each of the common voltage $V_{COM}$, the in-phase voltage FRP, and the opposite-phase voltage XFRP is applied to the buffers $71_1$, $71_2$, and $71_3$ from a positive power supply. In this example, the voltage value on the negative side of each of the common voltage $V_{COM}$, the in-phase voltage FRP, and the opposite-phase voltage XFRP is at the ground (GND) level. The buffers $71_1$, $71_2$, and $71_3$ respectively output the common voltage $V_{COM}$, the in-phase voltage FRP, and the opposite-phase voltage XFRP in synchronization with an inputted clock pulse.

The adjusting section $70_A$ according to Reference Example 1 configured as mentioned above raises the frequency of the clock pulse inputted to the buffers $71_1$, $71_2$, and $71_3$ so that flicker caused by a DC voltage constantly applied to the liquid crystal capacitor is not recognized by the viewer. Raising the frequency of the clock pulse means raising the frequency of each of the common voltage $V_{COM}$, the in-phase voltage FRP, and the opposite-phase voltage XFRP.

For example, the frequency of each of the common voltage $V_{COM}$, the in-phase voltage FRP, and the opposite-phase voltage XFRP is raised from 60 [Hz] to 120 [Hz]. However, driving pixels while raising the frequency of each of the common voltage $V_{COM}$, the in-phase voltage FRP, and the opposite-phase voltage XFRP as in the case of the adjusting section $70_A$ according to Reference Example 1 causes a problem in that power consumption increases by an amount corresponding to the raised frequency.

Reference Example 2

Figure 9:
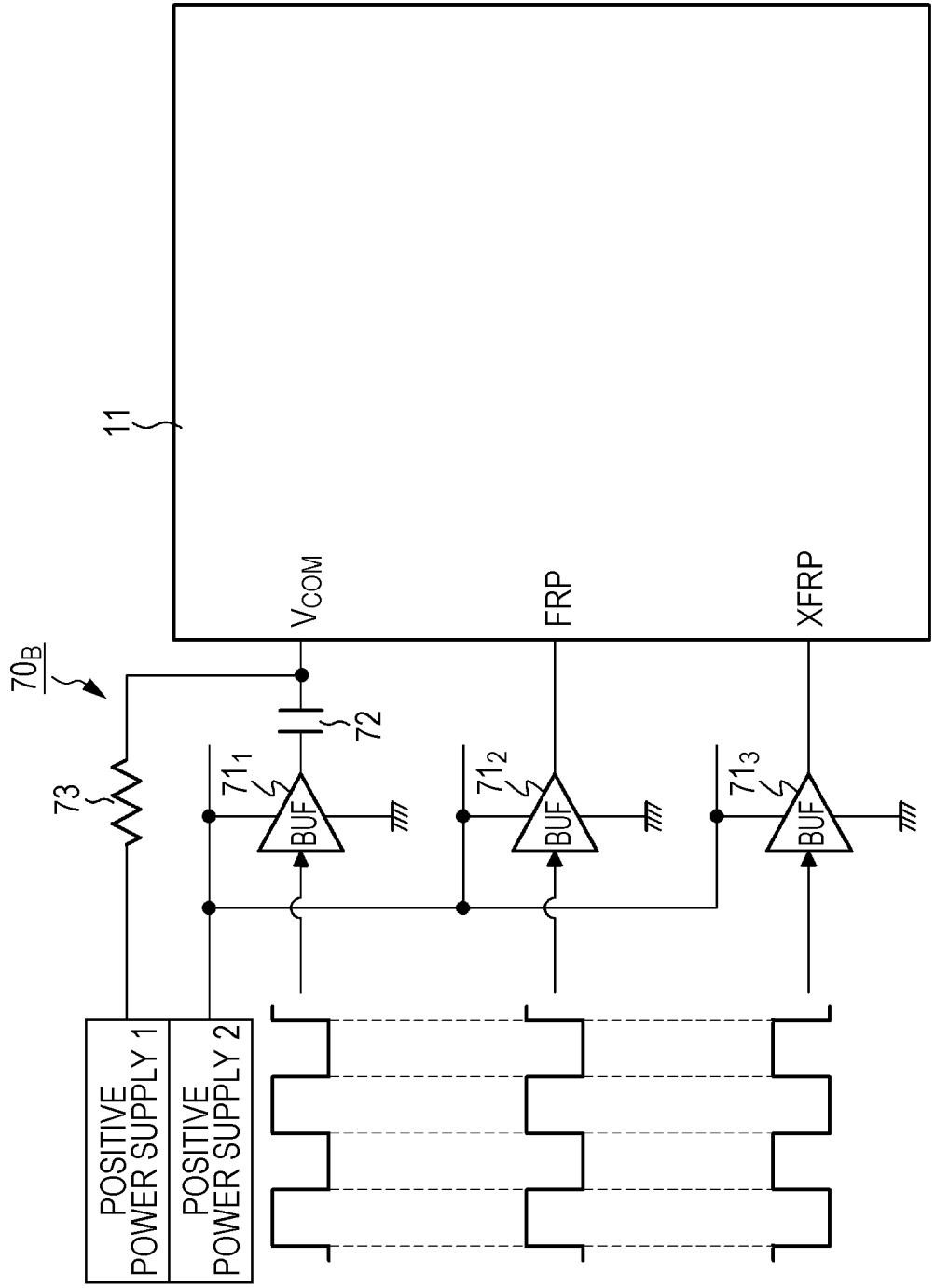
FIG. 9 is a configuration diagram illustrating an adjusting section according to Reference Example 2 for suppressing flicker.

FIG. 9 is a configuration diagram illustrating an adjusting section according to Reference Example 2 for suppressing flicker. In an adjusting section $70_B$ according to Reference Example 2, the common voltage $V_{COM}$ is offset to make the effective voltage values of the positive polarity and negative polarity equal, thereby preventing flicker caused by a DC voltage that is constantly applied to the liquid crystal capacitor.

Specifically, as illustrated in FIG. 9, a capacitor 72 is connected between the output terminal of the buffer $71_1$ for the common voltage $V_{COM}$, and the wire for the common voltage $V_{COM}$ on the liquid crystal display panel 11. Also, a power supply voltage is applied to the output terminal side of the capacitor 72 from a positive power supply 1 via a resistor 73. As a result, for example, the common voltage $V_{COM}$ outputted with an amplitude of 0 [V] to 3 [V] from the buffer $71_1$ is outputted after being offset as a voltage with an amplitude of about −1 [V] to −2 [V].

In the case of the adjusting section $70_B$ configured as mentioned above, as the capacitor 72, a capacitor with a large capacitance value (e.g. a capacitance value that is 10 times or more greater) in comparison to the capacitance of the counter electrode of the liquid crystal capacitor is necessary. Consequently, there is a problem in that the system scale increases. Since the charge on the capacitor 72 is discharged via the resistor 73, it is not possible to supply the common voltage $V_{COM}$ with an ideal waveform to the counter electrode.

Reference Example 3

Figure 10:
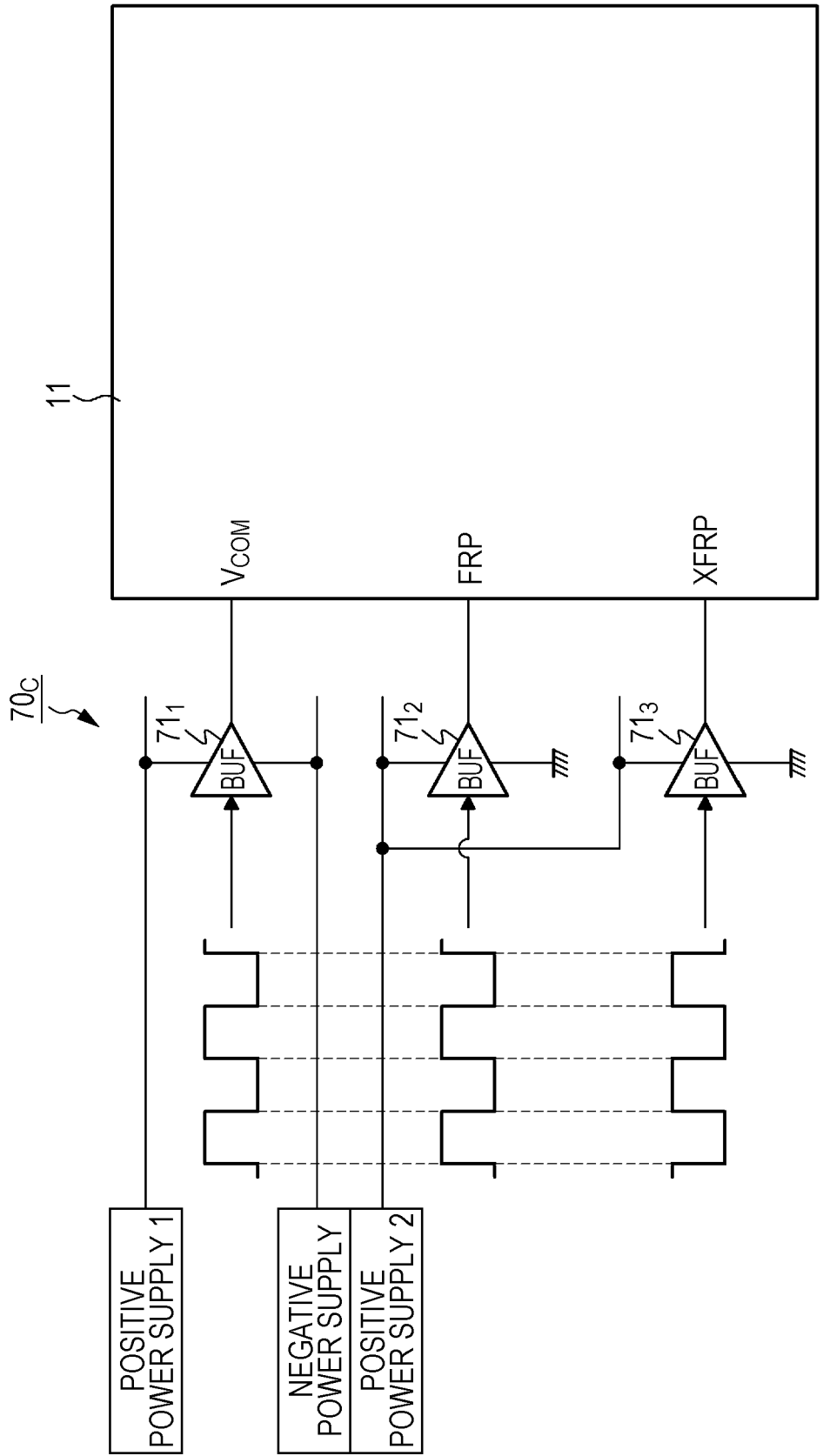
FIG. 10 is a configuration diagram illustrating an adjusting section according to Reference Example 3 for suppressing flicker.

FIG. 10 is a configuration diagram illustrating an adjusting section according to Reference Example 3 for suppressing flicker. In an adjusting section $70_C$ according to Reference Example 3, as in the case of the adjusting section $70_B$ according to Reference Example 2, the common voltage $V_{COM}$ is offset to make the effective voltage values of the positive polarity and negative polarity equal, thereby preventing flicker.

Specifically, as illustrated in FIG. 10, with respect to the buffer $71_1$ for the common voltage $V_{COM}$, a positive-side power supply voltage for determining the voltage value on the positive side of the common voltage $V_{COM}$ is applied from the positive power supply 1, and a negative-side power supply voltage for determining the voltage value on the negative side of the common voltage $V_{COM}$ is applied from a negative power supply.

However, in the case of the adjusting section $70_C$ according to Reference Example 3, the negative power supply for determining the voltage value on the negative side of the common voltage $V_{COM}$ is separately necessary, causing an increase in circuit scale and an increase in power consumption in comparison to Reference Example 1 and Reference Example 2.

[2-5. Characteristic Features According to an Embodiment]

The characteristic features of this embodiment reside in suppressing flicker by adopting a novel technique of adjusting the amplitude of at least the opposite-phase voltage XFRP, rather than by adopting the technique of raising frequency as in Reference Example 1 or the technique of offsetting the common voltage $V_{COM}$ as in Reference Examples 2 and 3.

While the description of Reference Examples 1 to 3 is directed to the case of common inversion ($V_{COM}$ inversion) drive method in which the polarity of the common voltage $V_{COM}$ reverses, the common voltage $V_{COM}$ may be either a voltage that reverses polarity every predetermined period (e.g. every frame period), or a DC voltage.

In this regard, when the common voltage $V_{COM}$ is a voltage that reverses polarity every predetermined period, as the first voltage that is the same as the common voltage $V_{COM}$, a voltage FRP that is in phase with the common voltage $V_{COM}$ is used. At this time, the second voltage is a voltage XFRP that is in opposite phase with the common voltage $V_{COM}$.

When the common voltage $V_{COM}$ is a DC voltage, as the first voltage that is the same as the common voltage $V_{COM}$, a DC voltage with the same voltage value as the common voltage $V_{COM}$ is used. At this time, the second voltage is a voltage that reverses polarity every predetermined period, that is, a voltage XFRP that is in opposite phase with the common voltage $V_{COM}$.

In this regard, the expression "at least the opposite-phase voltage XFRP" used in the case of adjusting the amplitude of at least the opposite-phase voltage XFRP means that in the case of common inversion ($V_{COM}$ inversion) drive, the amplitude of each of the in-phase voltage FRP and the opposite-phase voltage XFRP is adjusted. Also, when the common voltage $V_{COM}$ is a DC voltage, the amplitude of the opposite-phase voltage XFRP is adjusted.

Hereinafter, specific examples of this embodiment for suppressing flicker will be described as Example 1 and Example 2. Example 1 represents the case of common inversion drive in which the common voltage $V_{COM}$ reverses polarity every predetermined period (e.g. every frame period). Example 2 represents a case where the common voltage $V_{com}$ is a DC voltage.

Example 1

Figure 11:
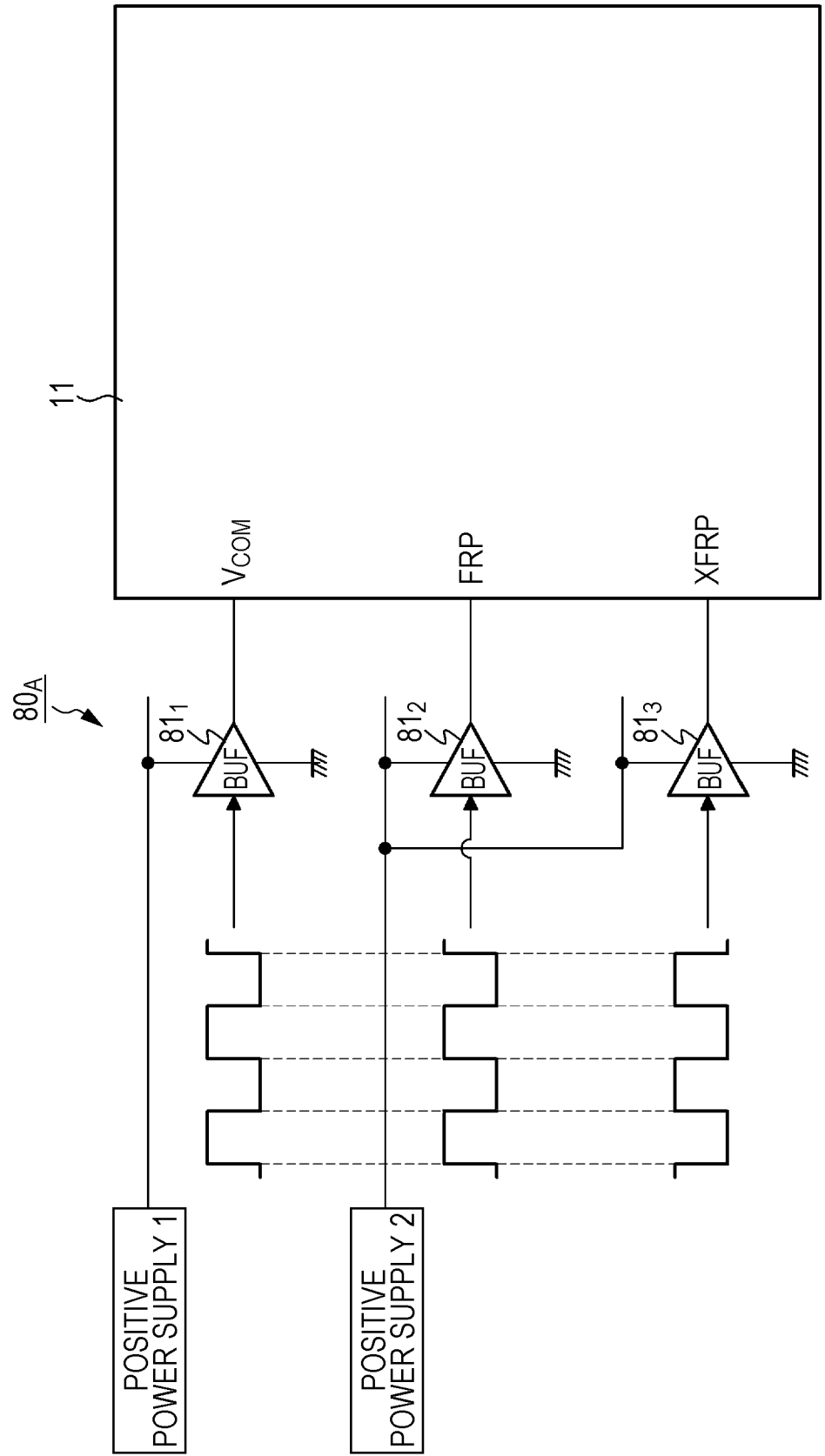
FIG. 11 is a configuration diagram illustrating an adjusting section according to Example 1 for suppressing flicker.

FIG. 11 is a configuration diagram illustrating an adjusting section according to Example 1 for suppressing flicker. As illustrated in FIG. 11, an adjusting section $80_A$ according to Example 1 is provided, for example, outside the liquid crystal display panel 11. A common voltage $V_{COM}$, a voltage FRP in phase with the common voltage $V_{COM}$, and a voltage XFRP in opposite phase are respectively outputted from buffers $81_1$, $81_2$, and $81_3$ constituting the output stages of the adjusting section $80_A$, and applied to the liquid crystal display panel 11.

A power supply voltage for determining the voltage value on the positive side of the common voltage $V_{COM}$ is applied to the buffer $81_1$ from the positive power supply 1. Also, a power supply voltage for determining the voltage value on the positive side of each of the voltage FRP in phase with the common voltage $V_{COM}$, and the voltage XFRP in opposite phase is supplied to the buffers $81_2$ and $81_3$ from a positive power supply 2. In this example, the voltage value on the negative side of each of the common voltage $V_{COM}$, the in-phase voltage FRP, and the opposite-phase voltage XFRP is at the ground level.

Figure 12:
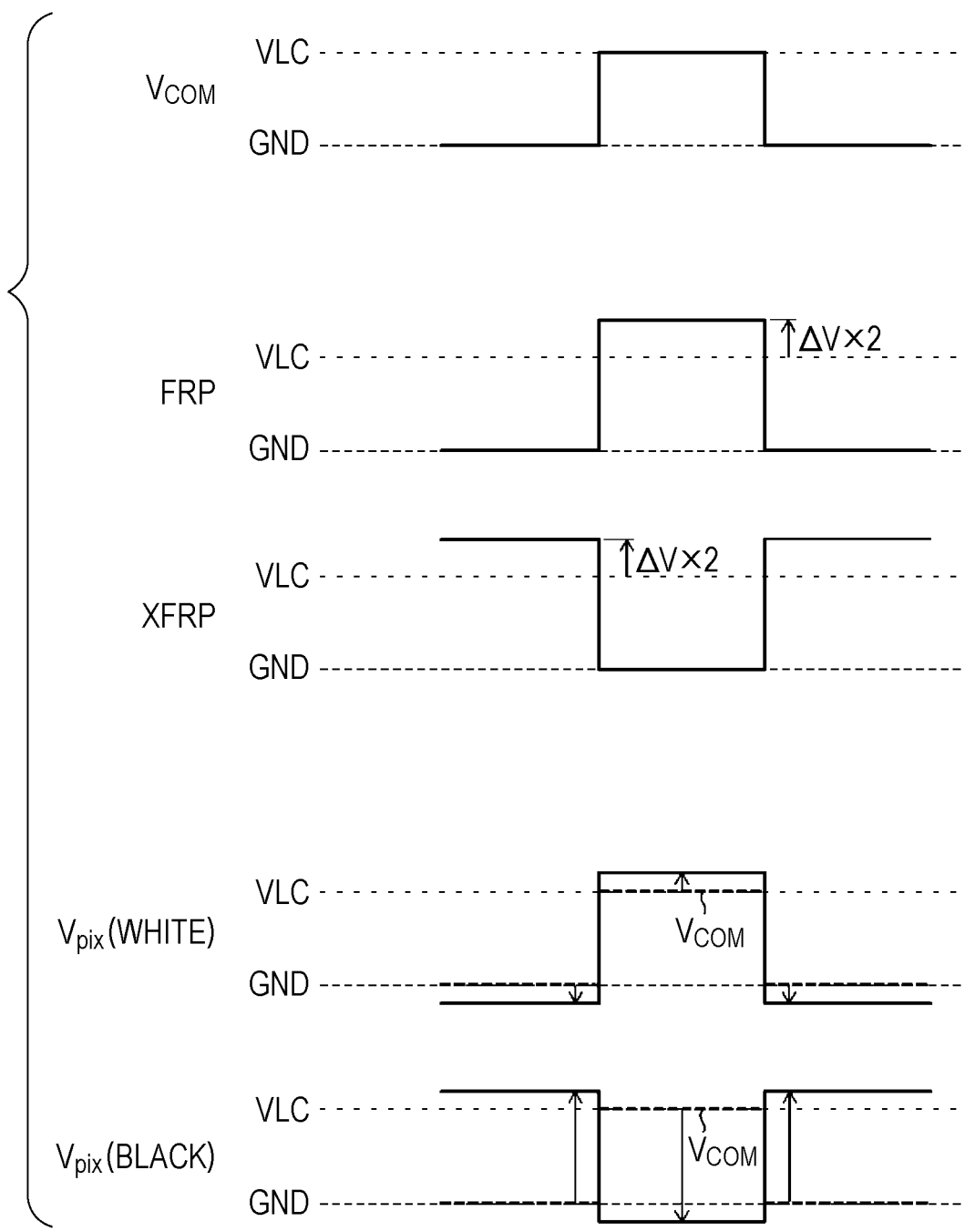
FIG. 12 illustrates the waveforms of a common voltage $V_{COM}$, in-phase voltage FRP, and opposite-phase voltage XFRP, and the waveform of a pixel potential $V_{pix}$ during white display/black display according to Example 1.

The buffers $81_1$, $81_2$, and $81_3$ respectively output the common voltage $V_{COM}$, the in-phase voltage FRP, and the opposite-phase voltage XFRP in synchronization with an inputted clock pulse. FIG. 12 illustrates the waveforms of the common voltage $V_{COM}$, in-phase voltage FRP, and opposite-phase voltage XFRP, and further, the waveform of a pixel potential $V_{pix}$ (white/black) applied to the pixel during white display/black display.

As illustrated in the waveform diagram of FIG. 12, the adjusting section $80_A$ according to Example 1 adjusts the amplitude of each of the in-phase voltage FRP and the opposite-phase voltage XFRP so as to increase, that is, so that the voltage value on the positive side becomes higher. At this time, letting VLC be the voltage value on the positive side of the common voltage $V_{COM}$, and $\Delta V$ be the DC voltage constantly applied to the liquid crystal capacitor, it is preferable to adjust the amplitude so that the voltage value on the positive side of each of the in-phase voltage FRP and the opposite-phase voltage XFRP becomes higher than the voltage value VLC by $\Delta V \times 2$. The voltage value on the positive side of each of the in-phase voltage FRP and the opposite-phase voltage XFRP can be set by the power supply voltage on the positive side of each of the buffers $81_2$ and $81_3$, that is, the power supply voltage of the positive power supply 2.

In this way, the amount of adjustment of the voltage value on the positive side of each of the in-phase voltage FRP and the opposite-phase voltage XFRP is set to a voltage $\Delta V \times 2$ that is twice the DC voltage constantly applied to the liquid crystal capacitor. Thus, as illustrated in the waveform diagram of FIG. 12, the difference between the common voltage $V_{COM}$ and the pixel potential $V_{pix}$ (indicated by an arrow in FIG. 12) becomes the same between the positive side and negative side. As a result, the same potential is applied to the liquid crystal capacitor for both the positive polarity and the negative polarity. Therefore, the DC voltage constantly applied to the liquid crystal capacitor can be compensated for by the amount of amplitude adjustment.

That is, the adjusting section $80_A$ according to Example 1 makes it possible to suppress flicker caused by a DC voltage constantly applied to the liquid crystal capacitor, by the very simple technique of changing the power supply voltage on the buffers $81_2$ and $81_3$, without raising frequency or offsetting the common voltage $V_{COM}$.

For example, in the case of a normally white liquid crystal, the voltage applied to the liquid crystal capacitor when displaying white (when the in-phase voltage FRP is selected) is ideally 0 [V]. When the adjusting section $80_A$ according to Example 1 is used, a voltage much smaller than 1 [V] is applied to the liquid crystal capacitor when displaying white.

However, considering the characteristics of a liquid crystal, application of a voltage on the order of 1 [V] does not cause a state transition from white display to black display. Therefore, application of a slight voltage to the liquid crystal capacitor does not adversely affect the optical characteristics. An increase in power consumption due to application of a slight voltage to the liquid crystal capacitor is also very small, and does not present a problem.

Example 2

Figure 13:
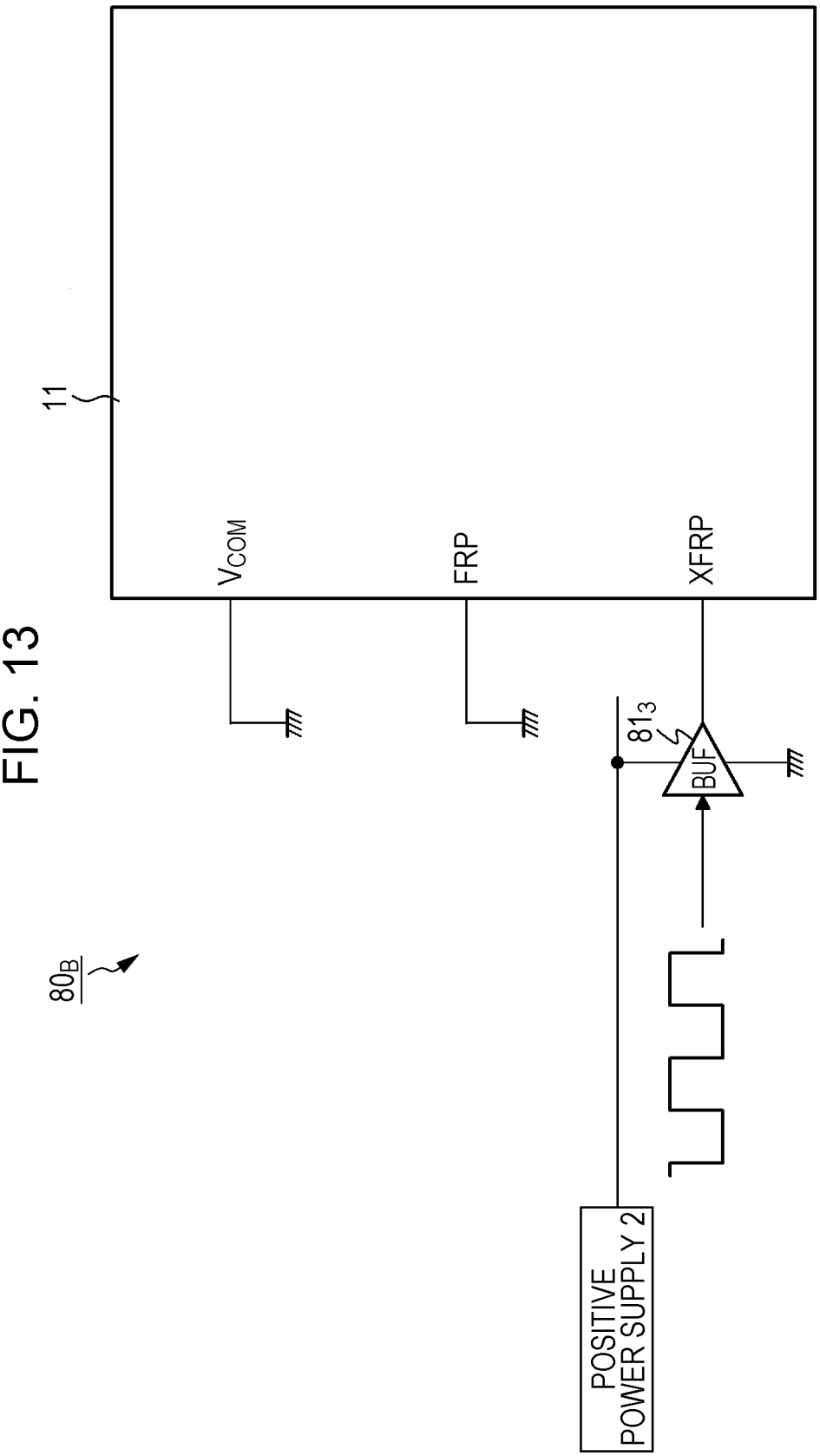
FIG. 13 is a configuration diagram illustrating an adjusting section according to Example 2 for suppressing flicker.
Figure 14:
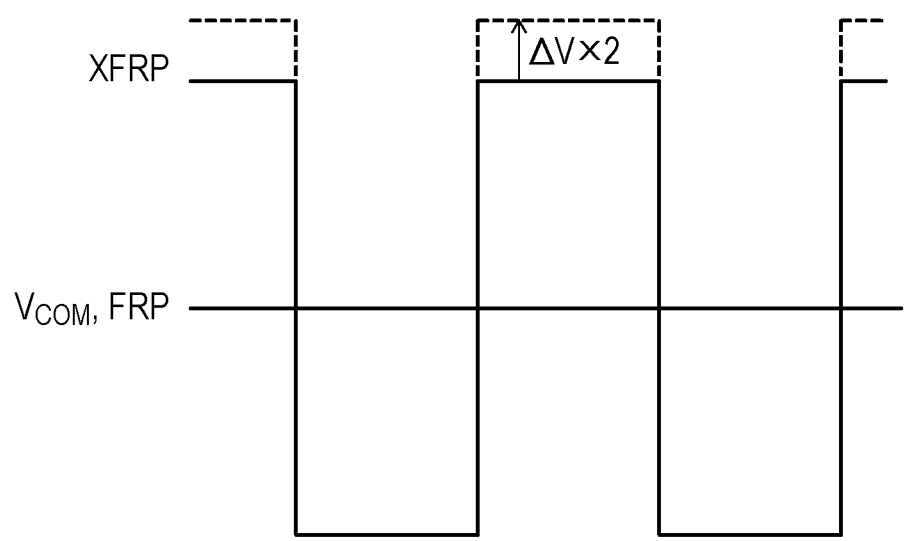
FIG. 14 illustrates the waveforms of the common voltage $V_{COM}$, in-phase voltage FRP, and opposite-phase voltage XFRP according to Example 2.

FIG. 13 is a configuration diagram illustrating an adjusting section according to Example 2 for suppressing flicker. As illustrated in FIG. 13, the common voltage $V_{COM}$ and the voltage FRP in phase with the common voltage $V_{COM}$ are each a DC voltage (at the ground level in this example). In contrast, the opposite-phase voltage XFRP that is the second voltage is a voltage that reverses polarity every predetermined period (e.g. every frame period). FIG. 14 illustrates the waveforms of the common voltage $V_{COM}$, in-phase voltage FRP, and opposite-phase voltage XFRP.

As illustrated in the waveform diagram of FIG. 14, an adjusting section $80_B$ according to Example 2 adjusts the opposite-phase voltage XFRP, preferably its amplitude, so that its average value is shifted to the positive side with respect to the common voltage $V_{COM}$ (=voltage FRP). At this time, it is preferable to adjust the amplitude so that the voltage value on the positive side of the opposite-phase voltage XFRP becomes higher than the voltage value VLC by $2 \times \Delta V$. The voltage value on the positive side of the opposite-phase voltage XFRP can be set by the power supply voltage on the positive side of the buffer $81_3$, that is, the power supply voltage of the positive power supply 2.

That is, the adjusting section $80_B$ according to Example 2 makes it possible to suppress flicker caused by a DC voltage constantly applied to the liquid crystal capacitor, by the very simple technique of changing the power supply voltage on the buffer $81_3$, without raising frequency or offsetting the common voltage $V_{COM}$. While the voltage value on the positive side of the opposite-phase voltage XFRP is adjusted in this example, the same operation and effect can be attained also by shifting the entire waveform of the opposite-phase voltage XFRP by $\Delta V \times 2$.

<3. Electronic Apparatus>

The liquid crystal display device according to an embodiment of the present disclosure described above can be used as a display section (display device) for an electronic apparatus in any field that displays a video signal inputted to the electronic apparatus or a video signal generated within the electronic apparatus as an image or video.

As can be appreciated from the foregoing description of the embodiment, the liquid crystal device according to an embodiment of the present disclosure has a characteristic feature that the liquid crystal display device can suppress flicker caused by a DC voltage that is constantly applied to the liquid crystal capacitor. Therefore, by using the liquid crystal display device according to an embodiment of the present disclosure as a display section for an electronic apparatus in any field, flicker-free image display can be achieved.

Examples of an electronic apparatus that uses the liquid crystal display device according to an embodiment of the present disclosure as its display section include a digital camera, a video camera, a game machine, and a notebook personal computer. In particular, the liquid crystal display device according to an embodiment of the present disclosure is suitable for use as a display section in an electronic apparatus, for example, a portable information apparatus such as an electronic book apparatus or an electronic watch, or a portable communication apparatus such as a portable telephone or a personal digital assistant (PDA).

<4. Configuration According to an Embodiment of the Present Disclosure>

An embodiment of the present disclosure can be configured as follows.

(1) A liquid crystal display device including: an array of pixels each having a memory function; a driving section that supplies a common voltage to a counter electrode of a liquid crystal capacitor, and supplies one of a first voltage and a second voltage to a pixel electrode of the liquid crystal capacitor, the first voltage being the same as the common voltage, the second voltage reversing polarity every predetermined period; and an adjusting section that adjusts an amplitude of at least the second voltage.

(2) The liquid crystal display device according to (1) mentioned above, wherein: the common voltage is a voltage that reverses polarity every predetermined period; the first voltage is a voltage that is in phase with the common voltage; and the second voltage is a voltage that is in opposite phase with the common voltage.

(3) The liquid crystal display device according to (2) mentioned above, wherein the adjusting section adjusts an amplitude of each of the first voltage and the second voltage.

(4) The liquid crystal display device according to (3) mentioned above, wherein the adjusting section adjusts a voltage value on a positive side of each of the first voltage and the second voltage by an amount equal to twice a DC voltage that is constantly applied to the liquid crystal capacitor.

(5) The liquid crystal display device according to (4) mentioned above, wherein the voltage value on the positive side is set by a power supply voltage on a buffer that outputs each of the first voltage and the second voltage.

(6) The liquid crystal display device according to (1) mentioned above, wherein: the common voltage is a DC voltage; and the first voltage is a DC voltage with the same voltage value as the common voltage.

(7) The liquid crystal display device according to (6) mentioned above, wherein an average value of the second voltage is shifted to the positive side with respect to the common voltage.

(8) The liquid crystal display device according to (6) or (7) mentioned above, wherein the adjusting section adjusts a voltage value on a positive side of the second voltage by an amount equal to twice a DC voltage that is constantly applied to the liquid crystal capacitor.

(9) The liquid crystal display device according to (8) mentioned above, wherein the voltage value on the positive side is set by a power supply voltage on a buffer that outputs the second voltage.

(10) A method of driving a liquid crystal display device that includes an array of pixels each having a memory function, the liquid crystal display device being configured to supply a common voltage to a counter electrode of a liquid crystal capacitor, and supply one of a first voltage and a second voltage to a pixel electrode of the liquid crystal capacitor, the first voltage being the same as the common voltage, the second voltage reversing polarity every predetermined period, the method including: adjusting an amplitude of at least the second voltage.

(11) An electronic apparatus including a liquid crystal display device, the liquid crystal display device including: an array of pixels each having a memory function; a driving section that supplies a common voltage to a counter electrode of a liquid crystal capacitor, and supplies one of a first voltage and a second voltage to a pixel electrode of the liquid crystal capacitor, the first voltage being the same as the common voltage, the second voltage reversing polarity every predetermined period; and an adjusting section that adjusts an amplitude of at least the second voltage.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal display device comprising:
an array of pixels each having a memory function;
a first buffer to supply a common voltage to a counter electrode of a liquid crystal capacitor,
a second buffer to output a first voltage that is in phase with the common voltage, and
a third buffer to output a second voltage that is in opposite phase with the second voltage,
wherein each of the pixels supplies one of a first voltage and a second voltage to a pixel electrode of the liquid crystal capacitor according to a data value stored in the each of the pixels,
the common voltage, the first voltage, and the second voltage have a same amplitude,
the first buffer, the second buffer, and the third buffer commonly have a power supply;
the frequency of the common voltage, the first voltage, and the second voltage is 120 Hz.

2. A liquid crystal display device comprising:
an array of pixels each having a memory function;
a first buffer to output a common voltage,
a second buffer to output a first voltage that is in phase with the common voltage; and
a third buffer to output a second voltage that is in opposite phase with the common voltage,
wherein each of the pixels supplies one of a first voltage and a second voltage to a pixel electrode of a liquid crystal capacitor according to a data value stored in the each of the pixels,
the first buffer, the second buffer, and the third buffer commonly have a first power supply;
an off-set voltage is supplied to a counter electrode of the liquid crystal capacitor from a second power supply different from the first power supply; and
the first buffer and the array of the pixels form capacitors.

3. A liquid crystal display device comprising:
an array of pixels each having a memory function;
a first buffer to supply a common voltage to a counter electrode of a liquid crystal capacitor,
a second buffer to output a first voltage that is in phase with the common voltage; and
a third buffer to output a second voltage that is in opposite phase with the common voltage,
wherein each of the pixels supplies one of a first voltage and a second voltage to a pixel electrode of the liquid crystal capacitor according to a data value stored in the each of the pixels,
the second buffer and the third buffer commonly have a first power supply;
the first voltage and the second voltage have a same amplitude,
the first buffer is supplied with power from a positive power supply and a negative power supply that are different from the first power supply,
an amplitude of the common voltage is the same as a voltage difference between the positive power supply and the negative power supply.

* * * * *